United States Patent Office 3,032,589
Patented May 1, 1962

3,032,589
METHOD OF PREPARING ORGANO-PHOSPHORUS OXIDES
Arthur K. Hoffmann, Springdale, and Audrey G. Tesch, Trumbull, Conn., assignors to American Cyanamid Company, New York, N.Y., a corporation of Maine
No Drawing. Filed Aug. 4, 1959, Ser. No. 831,460
4 Claims. (Cl. 260—606.5)

The present invention relates to a novel method of preparing tertiary phosphine oxides. More particularly, the instant discovery concerns a two-step process whereby tertiary aromatic phosphine oxides, such as triphenylphosphine oxide, are treated with metallic sodium and the resulting mixture reacted with an organic halide to produce useful derivatives of said phosphine oxides.

According to the present discovery a tertiary phosphine oxide corresponding to the formula

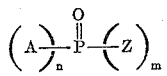

wherein $n$ is a value from 1 to 3 and $m$ is a value from 0 to 2, the sum of $n$ and $m$ being 3, A is an aryl group, substituted or unsubstituted, said substituent or substituents, if any, being inert under the conditions of the reaction, and Z is alkyl, said alkyl group having from 1 to 20 carbon atoms, is reacted, in the presence of an ether solvent selected from the group consisting of dimethyl ether, methyl ethyl ether, polyethers and cyclic ethers, with up to about 2 moles of metallic sodium, i.e., is brought into intimate contact with metallic sodium until substantially 2 moles of sodium per mole of phosphine oxide reactant has dissolved. The resulting salt or reaction mixture is admixed with a mono- or dihalo-substituted organic halide conforming to the formula

X'RX² wherein X' is halogen or hydrogen, X² is halogen, and R is alkyl, aralkyl, alkylene or alkenyl, the double bond of said alkenyl group being in a position at least beta to either halogen atom, said alkyl or alkenyl groups having from 3 to 20 carbon atoms. When both X' and X² are halogen atoms they are substituted on separate carbon atoms.

The above two-step reaction is made to take place under substantially anhydrous and anaerobic conditions. While the reaction is not fully understood, the product is positively identified and is a phosphine oxide differing from the reactant formula above in that an A group is replaced by the organic moiety of the organic halide. If a dihalide is employed, of course, two A groups, one from each of two separate phosphine oxide reactants, are displaced and the remaining moieties of each reactant are linked to the organic moiety of the organic halide. A typical product may be represented as follows:

Pursuant to a typical embodiment of the instant discovery, for example, triphenylphosphine oxide is admixed with an ether solvent, such as 1,2-dimethoxyethane, under anhydrous and anaerobic conditions and the resulting mixture in turn intermingled with finely-divided metallic sodium. This mixture is kept in a state of agitation for about 30 hours.

A dark green-brown solution results which is reacted with an alkyl halide, such as methyl iodide, and the resulting mixture centrifuged and distilled to recover an oily residue which is leached with ether and then benzene. Evaporation of the benzene yields product diphenylmethylphosphine oxide in good yield.

Among the many phosphine oxide reactants contemplated herein are diphenylmethylphosphine oxide, triphenylphosphine oxide, diphenylbenzylphosphine oxide, diphenylethylphosphine oxide, methyldi-p-tolylphosphine oxide, dimethyl(2,5-dimethylphenyl)phosphine oxide, diphenyl(4-N,N-dimethylphenyl)phosphine oxide, ethylpropylphenyl-phosphine oxide, trixenylphosphine oxide and numerous other similar oxides embraced in the reactant formula given above.

By the same token, typical organic halides within the purview of the instant invention are methyl iodide, butyl bromide, benzyl chloride, methyl bromide, benzyl fluoride, bromopentene-2, octylbromide, allyl chloride, cetyl iodide, and the like.

As indicated above, it is essential that the present process be carried out under substantially anhydrous and anaerobic conditions. The presence of water or air not only has a deleterious effect upon yields but gives rise to different organic derivatives of the phosphine reactant.

Among the ether solvents contemplated herein are methyl ethyl ether, 1,2-dimethoxyethane, tetrahydrofuran, or other polyethers, such as dimethyl or diethyl glycol ethers and other cyclic ethers.

Typical substituents contemplated for the aryl moiety or moieties of the tertiary aromatic phosphine oxide reactants defined above are alkyl, alkoxy, N,N-dialkyl, acetal, ketal, and like substituents which are inert under the conditions of the reaction, i.e., which do not provide an acidic hydrogen.

Surprisingly enough, metallic sodium is the only alkali metal capable of effecting the reaction contemplated herein. For instance, substitution of lithium or potassium for sodium gives rise to the production of oxides in which the organic moiety of the organic halide reactant is annexed to one of the aryl components of the aromatic oxide reactant. The following equation illustrates this:

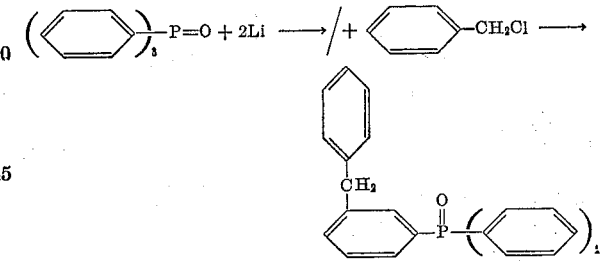

It has been found pursuant to the present invention that best results are obtained by providing up to 2 molar equivalents of metallic sodium per mole of tertiary phosphine oxide reactant. Preferably, 1–2:1 equivalents, sodium to oxide, is employed. On the other hand, the molar ratio of phosphine oxide to mono-halogen-substituted organic halide is generally about 1:1. Likewise, the phosphine oxide to di-halogen-substituted organic halide ratio is usually about 2:1. While the oxide to halide reaction is essentially stoichiometric, an excess of either reactant, i.e., of either the oxide or the halide, is tolerable without materially affecting the reaction.

The reaction contemplated herein may be carried out at atmospheric, sub-atmospheric or super-atmospheric pressure. By the same token, temperatures in the range of −40° C. to 200° C. are desirable, preferably 0° C. to 60° C. These temperatures are applicable to the first step of the reaction, i.e., the reaction of metallic sodium with the phosphine oxide reactant. Insofar as the second step of the reaction is concerned, i.e., treatment of the intermediate salt of phosphine oxide with an organic halide, temperatures in the range of −60° C. to 100° C., preferably −10° C. to 60° C., may be employed.

The invention will best be understood by reference to the following examples which while specific are not intended to limit the scope of the discovery:

EXAMPLE I

Diphenylmethylphosphine Oxide

Triphenylphosphine oxide, 10.0 grams (0.036 mole) is charged to a 250-milliliter Erlenmeyer flask containing glass chips and a magnetic stirring bar. The flask is heated at 160° C.–170° C. for several hours, after which the flask is connected to a nitrogen flushed distillation apparatus and 100 milliliters of 1,2-dimethoxy-ethane distilled onto the phosphine oxide under nitrogen. Metallic sodium, 3.35 grams (0.145 mole) cut into fine chips, is added under a nitrogen blanket and the reaction mass stirred for 72 hours. The resulting solution is a dark green-brown in color. At the end of this time, sufficient methyl iodide is added to decolorize the solution and excess sodium manually removed. The sodium consumed is 1.65 grams (0.072 mole) or 2 molar equivalents/mole of triphenyl-phosphine oxide. The resulting reaction solution is then centrifuged and, from the resulting centrifugate, dimethoxyethane is removed by distillation, thus leaving an oily residue which is then re-extracted with benzene. Evaporation of the benzene gives diphenylmethylphosphine oxide product which, after recrystallization from benzene, has a melting point of 104° C.–105° C.

EXAMPLE II

Diphenylbutylphosphine Oxide

Following the procedure of Example I, above, n-butyl bromide is added to decolorize the sodium triphenylphosphine oxide solution. After evaporation of the solvent, the resulting yellow residue is extracted with refluxing cyclohexane in lieu of ether. Product diphenyl-n-butylphosphine oxide separates on standing and is purified by several recrystallizations from ether to give a product having a melting point of 88° C.–89° C.

EXAMPLE III

Diphenylbenzylphosphine Oxide

Triphenylphosphine oxide, 10.0 grams (0.036 mole), is stirred with 1.65 grams (0.072 mole) of metallic sodium in 100 milliliters of nitrogen-saturated anhydrous 1,2-dimethoxyethane until dissolution of the metal is substantially complete, i.e., about 48 hours. Benzyl chloride, 10 grams (0.079 mole), is added and the reaction mass allowed to stand. The mixture turns pale yellow and considerable solid is deposited. After the addition of 50 milliliters of benzene, the solid is removed by filtration. The solid is extracted with hot benzene yielding product diphenylbenzylphosphine oxide which crystallizes in needles and has a melting point of 189° C.–190° C.

EXAMPLE IV

Diphenylethylphosphine Oxide

Triphenylphosphine oxide, 10.0 grams (0.036 mole), is reacted in 100 milliliters of 1,2-dimethoxyethane with 1.8 grams (0.078 mole) of sodium. After 24 hours stirring, 10 grams (0.092 mole) of ethyl bromide is added. Deposition of solid occurs during the exothermic reaction and 0.42 gram of unreacted sodium is manually removed. The solid is removed by filtration and the filtrate evaporated to dryness. The resulting residue is extracted with refluxing cyclohexane which, upon cooling, deposits 5.8 grams of diphenylethylphosphine oxide. An additional recrystallization from cyclohexane containing a small amount of charcoal yields product diphenylethylphosphine oxide having a melting point of 121° C.–122° C.

EXAMPLE V

Phenylethylbenzylphosphine Oxide

Diphenylethylphosphine oxide, 10.0 grams (0.043 mole), is stirred in 80 milliliters of 1,2-dimethoxyethane with 2.2 grams (0.096 mole) of sodium for 96 hours. At the end of this time, 6.0 grams (0.047 mole) of benzyl chloride is added. After standing several hours, the reaction mass is centrifuged and 0.41 gram of unreacted sodium is recovered. The solvent is distilled leaving a brown oily residue which on the addition of 3 volumes of ether solidifies. The solid is filtered and washed with small portions of ether. The resulting solid is dissolved in benzene and passed through a 2″ x 1″ column of 33 percent Darco G–60 supported on HyFlo Supercel to remove all colored impurities. The clear benzene solution is evaporated to dryness and the residue crystallized from ether-benzene (90:10). Phenylethylbenzylphosphine oxide is obtained in long needles and has a melting point of 117° C.–118° C. *Analysis.*—Calculated for $C_{15}H_{17}PO$: C, 73.75; H, 7.02; P, 12.68. Found: C, 73.47; H, 7.30; P, 12.68.

EXAMPLE VI

Diphenylisoamylphosphine Oxide

The process of Example III, above, is followed in every essential respect with the exception that the organic halide used is isoamylbromide, 10.8 grams (0.072 mole). Product diphenylisoamylphosphine oxide, after solvent evaporation, is crystallized from ether.

EXAMPLE VII

Allyl-p-Tolylphenylphosphine Oxide

Diphenyl-p-tolylphosphine oxide, 10.0 grams (0.034 mole) dissolved in 100 milliliters of tetrahydrofuran is reacted with 1.57 grams (0.068 mole) of metallic sodium. After complete dissolution of the metal, 2.62 grams (0.034 mole) of allyl chloride is added. The reaction mixture is stirred for 3 hours and filtered. The filtrate, after evaporation, is crystallized to give allyl-p-tolylphenylphosphine oxide.

EXAMPLE VIII

Diphenylbenzylphosphine Oxide

The process of Example III, above, is followed in every essential respect with the exception that dimethylether is used as solvent and 7.9 grams (0.072 mole) of benzyl fluoride is used to react with the sodium solution instead of benzyl chloride. Diphenylbenzylphosphine oxide is produced and recovered.

EXAMPLE IX

Trimethylphosphine Oxide

A reaction mixture of 2.7 grams (0.117 mole) of metallic sodium in 125 milliliters of 1,2-dimethoxyethane initially containing 10 grams (0.059 mole) of dimethyl-p-tolyl phosphine oxide is reacted with 8.4 grams (0.059 mole) of methyl iodide and the reaction mass stirred for 6 hours. At the end of this time, the solvent is removed by evaporation. Distillation of the residue affords trimethylphosphine oxide in solid form having a melting point of about 140° C.

EXAMPLE X

Tetramethylenebis(Diphenylphosphine Oxide)

To triphenylphosphine oxide, 10 grams (0.036 mole), is reacted in 100 milliliters of 1,2-dimethoxyethane with 1.65 grams (0.072 mole) of sodium. The resulting solution is treated with 3.8 grams (0.017 mole) of tetramethylene bromide and after standing for 3 hours is filtered. The resulting solid residue is extracted with hot chloroform, and product tetramethylenebis(diphenylphosphine oxide) of melting point 255° C.–257° C. precipitates from solution by the addition of pentane.

While Example X defines the use of tetramethylene bromide as the dihalide reactant, other dihalides may be similarly employed to yield corresponding bis-tertiary phosphine oxides; for example, pentamethylene chloride, octamethylene iodine, α,α'-dichloro-p-xylene, and the like, are typical.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A novel method of preparing phosphine oxide derivatives in which a tertiary aromatic phosphine oxide conforming to the formula

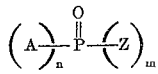

wherein $n$ is a value from 1 to 3 and $m$ is a value from 0 to 2, the sum of $n$ and $m$ being 3, A is selected from the group consisting of substituted and unsubstituted aryl radicals, said substituents being inert under the conditions of the reaction and not providing an acidic hydrogen, and Z is alkyl having from 1 to 20 carbon atoms, is reacted with up to about two moles of metallic sodium per mole of aromatic phosphine oxide reactant in the presence of an ether solvent selected from the group consisting of dimethyl ether, methyl ethyl ether, polyether, and cyclic ethers; the resulting product is brought into intimate contact with an organic halide corresponding to the formula

wherein X' is selected from the group consisting of halogen and hydrogen, $X^2$ is halogen, and R is selected from the group consisting of alkyl, alkylene, aralkyl and alkenyl radicals, the double bond of said alkenyl group being in a position at least beta to either halogen atom, and in the case where both X' and $X^2$ are halogen atoms they are attached to separate carbon atoms, said alkyl, alkylene and alkenyl groups having from 3 to 20 carbon atoms; the above reactions being made to take place under substantially anhydrous and anaerobic conditions; and recovering the corresponding phosphine oxide derivative in which one A in the aromatic phosphine oxide reactant formula above is replaced by R of the organic halide formula.

2. The process of claim 1 wherein X' is hydrogen.

3. The process of claim 1 wherein X' is halogen.

4. A novel method of preparing phosphine oxide derivatives in which triphenylphosphine oxide is reacted with up to about 2 moles of metallic sodium per mole of triphenylphosphine oxide reactant in the presence of an ether solvent selected from the group consisting of dimethyl ether, methyl ethyl ether, poly ether, and cyclic ethers; the resulting product is brought into intimate contact with an organic halide corresponding to the formula

wherein $X^1$ is selected from the group consisting of halogen and hydrogen, $X^2$ is halogen, and R is selected from the group consisting of alkyl, alkylene, aralkyl and alkenyl radicals, the double bond of said alkenyl group being in a position at least beta to either halogen atom, and in the case where $X^1$ and $X^2$ are halogen atoms they are attached to separate carbon atoms, said alkyl, alkylene and alkenyl groups having from 3 to 20 carbon atoms; the above reactions being made to take place under substantially anhydrous and anaerobic conditions; and recovering the corresponding phosphine oxide derivative in which one phenyl group of the triphenylphosphine reactant is replaced by R of the organic halide formula above.

No references cited.